Nov. 23, 1948.                F. JACOBSON                  2,454,557
                     NO-TWIST SELF-LOCKING COUPLING
                         Filed Jan. 12, 1944

INVENTOR
Franz Jacobson
BY
Kenyon & Kenyon
ATTORNEYS

Patented Nov. 23, 1948

2,454,557

UNITED STATES PATENT OFFICE 2,454,557

NO-TWIST SELF-LOCKING COUPLING

Franz Jacobson, New York, N. Y.

Application January 12, 1944, Serial No. 517,954

8 Claims. (Cl. 285—122)

This invention relates to improvements in couplings for connecting rigid pipe sections together or for connecting flexible metallic or other hose sections to such pipes or to adjacent lengths thereof. In couplings now in use an objectionable feature is that frequently when the coupling is being tightened there is a tendency to twist the pipe, and hose sections, or one of them, with resultant damage or injury to the pipe or hose sections.

A principal object of the invention is to provide an all-metal coupling construction obviating the foregoing objectionable feature.

Another principal object of the invention is to provide a coupling of this character that will be self-locking to prevent loosening of the union at the connection when subjected to vibration or to reciprocal motion, or to other types of motion that have a tendency to loosen couplings.

Another object of the invention is to provide a union or coupling device that may be used over and over again notwithstanding the fact that certain parts thereof become temporarily deformed in use to provide the self-locking feature of the device.

Still another object of the invention is to provide a coupling or union device incorporating features of construction that insure double safety against leakage so that the coupling provides an absolutely leakproof joint.

Another object of the invention is the provision of a coupling or union involving a minimum number of parts, and which may be manufactured in quantity, simply, quickly, and at relatively low cost.

To the accomplishment of the foregoing, and such other objects as may hereinafter appear, this invention consists in the novel construction and arrangement of parts hereinafter described in detail and then sought to be defined in the appended claims, reference being had to the accompanying drawing forming a part hereof which shows merely for the purposes of illustration, preferred embodiments of the invention, it being expressly understood, however, that changes may be made in practice without digressing from the inventive idea.

In the drawing, in which similar reference characters denote corresponding parts:

Figure 1:
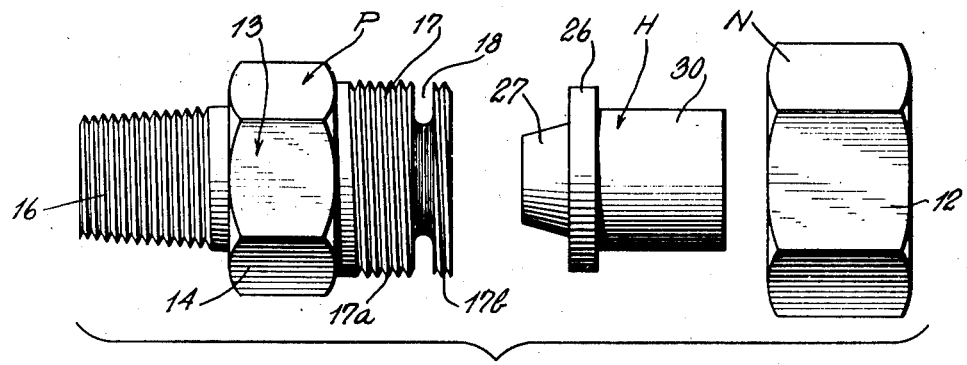
Fig. 1 is an elevation of the parts comprising the coupling, the parts being shown separated from each other for clear illustration.

Referring to the drawing, the coupling or union consists of three parts, a swivel nut N, a pipe connector P, and a hose connector H. These parts are made preferably of springy or resilient metal, such as brass, steel, or the like.

The swivel nut N is of conventional design, having an internal threaded portion 10, and an inwardly-extending annular shoulder 11. The nut is shaped externally with a wrench-receiving surface 12 that may have hexagonal shape as shown, or any other suitable shape.

The pipe connector part P comprises a tubular member 13. This member is provided with a wrench-receiving external surface 14 that may be hexagonal, as shown, or of any other suitable shape. A tapered threaded external portion 16 is provided adjacent one end of the member 13 to constitute means for mounting the connector P to pipe (not shown) in well-known manner. The opposite end of member 13 is also threaded externally at 17 and admeasured to receive the threaded portion 10 of the swivel nut N. The threaded portion 17 is divided into two separated portions 17a and 17b by an annular groove 18 cut into the member 13, but the two portions 17a and 17b are continuations of each other and the groove 18 does not interfere with threading of the nut N onto these threads. In effect, the groove 18 forms a weakened threaded portion 17b on the member 13 for a purpose to be presently described.

The internal bore of the member 13 has a portion 19 of uniform diameter, a portion 20 of enlarged diameter adjacent to the portion 19, and a tapered or countersunk portion 21 contiguous with the portion 20. The tapered portion flares outwardly from the portion 20 terminating in the end face 22 of member 13. The depth of the groove 18 and the countersunk portion 20 at the bottom of said groove 18 form a resilient connecting portion which connects the threaded flange with the body portion of the pipe connector and enables the threads of the flange to be automatically, temporarily displaced relative to the threads of the body portion of the pipe connector when the nut engages the shoulder of the hose connector and forces said shoulder into engagement with the threaded flange of the pipe connector. This end face 22 is somewhat undercut to provide an annular peripheral lip 23 for a purpose to be presently described.

Figure 3:
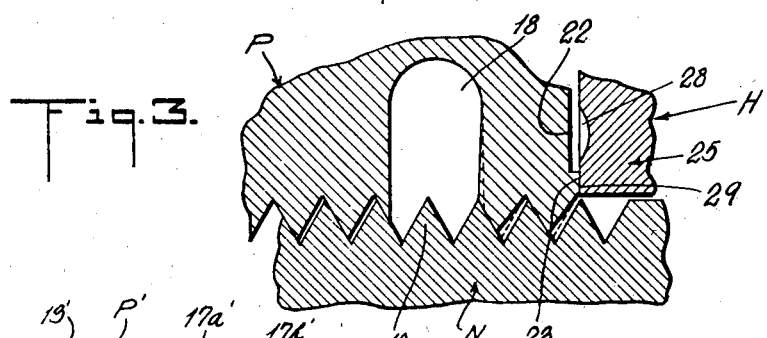
Fig. 3 is an enlarged fragmentary longitudinal section illustrating details of the interoperation between the parts that provides the self-locking feature of the coupling.

The hose connector member H, which is usually attached to flexible metallic hose or the like, and which is adapted to be secured to the pipe connector P by the swivel nut N, comprises a tubular body 25 whose internal bore 25' is preferably substantially of the same diameter as that of bore 19. This body has an external annular shoulder 26 admeasured to be engaged by the shoulder 11 of the swivel nut. A conical portion 27 is provided on the body 25. This conical portion is shaped complemental to the tapered or countersunk portion 21 of the member 13 and is adapted to be forced into said portion 21 when the nut N is tightened. An undercut, or recess, 28 is provided in the face of shoulder 26 adjacent to the base of the conical portion 27 to provide an annular peripheral lip 29. This lip 29 is adapted to engage the lip 23 of the pipe connector member 13 when the nut N is tightened. The relative dimensions of the cone portion 27, the shoulder 26, and lip 29 are such that when the nut N is tightened, the lip 29 will engage lip 23 before or about the same time that the cone portion 27 seats in the tapered or countersunk portion 21. Then, because of the engagement between the said lips 23 and 29, further tightening of the nut N to seat the cone portion 27 will cause deformation of the weakened threaded portion 17b from the dotted to the full line position, illustrated on an exaggerated scale in Fig. 3, and will cause the threads of the portions 17b to be jammed into exceedingly tight engagement with the threads of the nut N, and also the threads on the nut to be jammed into tight engagement with the threads on portion 17a. Such jammed position of the threads locks the coupling in its tightened position so that it will not jar loose when subject to vibration or any other type of motion while in use. The groove 18 is of sufficient width and depth and the portion 17b is sufficiently thin to permit the deformation mentioned. The cone portion 27 is dimensioned to offer more frictional resistance when engaging the wall of the countersunk portion 21 than any friction that can be produced by the pressure between shoulder 11 of the nut N and shoulder 26 of the hose connector H. The cone portion 27, for this purpose, is formed on an angle less than 90° and has a length commensurate with the desired result.

The member 25 is provided with a tubular tail or extension 30. This extension provides means to attach the member 25 to a flexible hose 31 that it is intended to couple to the pipe connector P. While the hose 31 has been shown as a flexible corrugated hose of known construction, it is to be understood that any type of hose or piping may be attached to the member 25. In the embodiment shown, the hose 31 has an overall external diameter corresponding substantially with the internal diameter of the tail or extension 30. It is inserted into this extension 30 and is suitably attached therein, as by soldering, brazing, welding, or any other manner.

In using the coupling, and assuming that the pipe connector P has its male threaded portion 16 attached to a rigid pipe (not shown) and that the hose connector H has been attached to tubing 31, as hereinbefore described, the cone portion 27 is inserted into the conical seat 21 of the pipe connector and nut N threaded onto thread 17. The nut N is then first tightened by hand on the thread 17. The shoulder 11 of the nut N engages shoulder 26 of the hose connector H and moves cone portion 27 into contact with the conical seat 21. At about the same time the lip 29 on the hose connector H is brought into contact with the lip 23 on the pipe connector P.

As the nut N is then further tightened by a wrench, or other tightening tool, three distinct actions takes place simultaneously: (1) Cone portion 27 is firmly pressed into the countersunk portion 21 and into frictional engagement with its wall; (2) Lip 29 is firmly pressed against the lip 23; (3) As a result of the latter pressure, the deformable or locking portion 17b of the thread 17 is moved forward axially at the same rate as the cone portion 27 is moved into the countersunk portion 21.

As a result of these actions, first, because of the high friction between the surface of the cone portion 27 and the surface of the countersunk portion, the hose connector H stays put; that is, it will not rotate while the nut N is being tightened by the wrench. This eliminates any possibility of twisting the hose 31 during tightening and thus prevents the setting up of any detrimental tortional stresses in the hose 31 or in any other hose or rigid pipe that might be attached to the hose connector H. Secondly, because of the described axial movement of the threaded portion or locking element 17b, the pitch line of the thread on said portion 17b is displaced with respect to the pitch line of the corresponding portion of the internal thread 10 of the nut N to effect the locking action hereinbefore described. This locking positively prevents any loosening of the nut N when subject to vibration or other motion.

A feature of the invention is that although the threaded portion 17b is distorted as described, the nut N can be loosened, if desired and the coupling can be used over again. When the nut N is loosened the resiliency of the metal of which pipe connector P is made restores the threaded portion 17b to its original undistorted form.

Another feature of the invention is that permanent wedging of the cone portion 27 in the countersunk portion 21 is prevented by the engagement of lips 23 and 29. They are so admeasured for this purpose. However, the resiliency of the weakened lock portion 17b carrying the lip 23 permits sufficient forward motion of the cone portion 27 into the countersunk portion 21 to achieve the results hereinbefore described.

Furthermore, when the parts have been tightened as described, double safety against leakage is provided by the firm contact between the cone portion 27 and the wall of the countersunk portion 21, and also by the firm contact between the lips 23 and 29.

Figure 2:
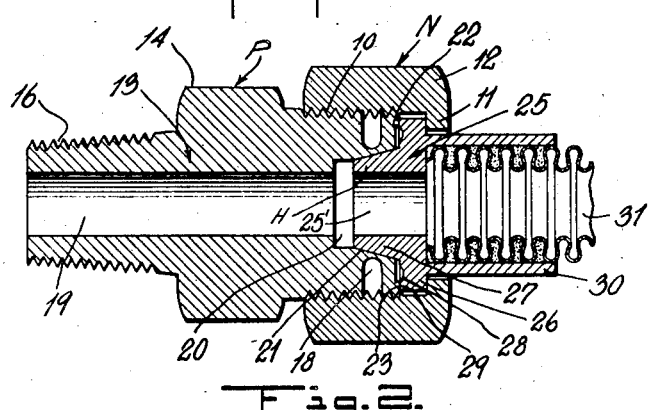
Fig. 2 is a longitudinal section of the parts of the union or coupling in assembled condition.
Figure 4:
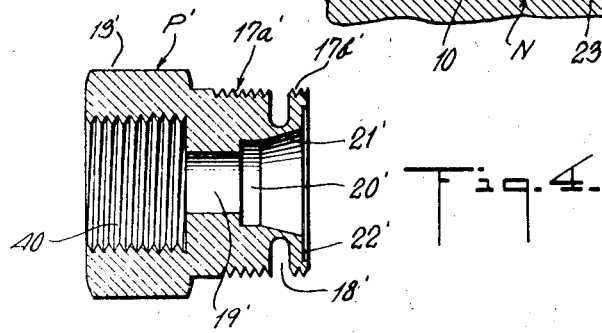
Fig. 4 is a longitudinal section of a female part that may be substituted for a male part of the coupling shown in Figs. 1 and 2.

It will be understood that the principles embodied in the coupling hereinbefore described may be applied to other types of connections. For example, the pipe connector P' of Fig. 4 may replace the connector P of Figs. 1 to 3. In this modified form of pipe connector P' the male connector portion 16 of Figs. 1 and 2 is replaced by an internally-threaded or female portion 40. The other parts of the pipe connector P' are identical with those of Figs. 1–3 and function in the same way. Reference characters in this figure that are primed, but otherwise identical with reference characters in Figs. 1–3 inclusive, denote identical parts. Any other conventional means for connecting the pipe connector P or P' to rigid pipe may be used. Either may be provided, in place of the portions 16 or 40, with other suitable types of conventional connections, such as elbows, or they may be replaced by parts suitable for brazing, soldering, or otherwise connecting the pipe connectors P or P' to pipe.

Likewise, the hose connector H may be attached in any other desired way to hose or to rigid pipe. In the latter case, the portion 30 might be replaced by a portion corresponding either to the portion 10 or portion 40.

Various other modifications in construction within the scope of the invention are possible and are contemplated. There is no intention of limitation to the exact details shown and described.

What is claimed is:

1. In a device of the character described, a first connector member, a second connector member and a nut for securing said members together, means on each connector member for attaching it to piping, interengaging means on the said two connector members for preventing rotation of one with respect to the other while said nut is tightened to secure the connectors together, and deformable means on one of said connectors adapted to be deformed in the axial direction of the connectors by the tightening of said nut member into its tightened condition, and means to effect such deformation whereby to effect locking of said nut member in said tightened condition.

2. In a device of the character described, a first connector, a second connector, one of said connectors having a threaded portion, a shoulder on the other of said connectors, a nut member having a threaded portion adapted to be screwed onto said first-named threaded portion, and a shoulder on said nut member for engaging said first-named shoulder whereby said connector members may be secured together, interengaging means on said connectors for preventing rotation of one with respect to the other while said nut is screwed onto said first-named threaded portion, deformable means on one of said connectors engaging said threaded portion of said nut, means on the other of said connectors for engaging said deformable means and moving it in the axial direction of the connectors as said nut is tightened whereby to deform said deformable means during final tightening of said nut member and thereby to lock said nut member in its tightened condition.

3. In a device of the character described, a hose connector, a pipe connector and a tightening nut for securing said connectors together, a threaded portion on said pipe connector on which said nut member is adapted to be screwed, said pipe connector being grooved in its said threaded portion to provide a deformable part, and said pipe connector having a conically-recessed portion whose apex angle is acute, a conical portion of complemental shape on said hose connector adapted to be received within said recessed portion, a lip on said hose connector member adapted to engage said deformable part and to deform said part when said nut is tightened on said threaded portion to lock said nut in its tightened position, and said conical portion and said lip being admeasured to cause sufficient frictional engagement between a surface of said conical portion and a surface of said recess during tightening of said nut to prevent rotation of said hose connector, whereby tortional stresses in a hose connected to said hose connector are prevented during such tightening.

4. A device of the character described including in combination a hose connector, a pipe connector having an externally threaded portion, and an internally threaded tightening nut for securing said connectors together, said threaded portion of said pipe connector having a groove of substantial depth located near its end and dividing said threaded portion into a body portion and an extremital flange portion which is thin enough so as to be temporarily bent or displaced under pressure, said pipe connector and said hose connector having complementary parts adapted to engage to form a tight joint, said hose connector having an external annular shoulder, said tightening nut having an inwardly extending end flange adapted to engage said shoulder when said nut is tightened and to force the pipe connector and hose connector into tight engagement with each other, said shoulder on said hose connector engaging said threaded flange on said pipe connector so as to temporarily bend or displace the same from its normal position causing a temporary displacement of the threads thereof and consequent abnormal tight engagement of said threads with the threads of said nut whereby accidental uncoupling of the parts is prevented.

5. A device of the character described including in combination a hose connector, a pipe connector having an externally threaded portion, and an internally threaded tightening nut for securing said connectors together, said threaded portion of said pipe connector having a groove of substantial depth located near its end and dividing said threaded portion into a body portion and an extremital flange portion which is thin enough so as to be temporarily bent or displaced under pressure, said hose connector having an external annular shoulder, said tightening nut having an inwardly extending end flange adapted to engage said shoulder when said nut is tightened and to force the pipe connector and hose connector into tight engagement with each other, said shoulder on said hose connector and said extremital flange portion of said pipe connector when engaging said nut is tightened temporarily to bend or displace said threaded flange from its normal position causing a temporary displacement or misalinement of the threads thereof and the consequent abnormal tight engagement of said threads with the threads of said nut whereby accidental uncoupling of the parts is prevented.

6. A device of the character described including in combination a hose connector, a pipe connector and an internally threaded tightening nut for securing said connectors together, said hose connector and said pipe connector having complementary parts adapted to fit together to form a tight joint, said hose connector being provided with an external annular shoulder, said pipe connector having an extended exteriorly threaded portion, the thread throughout having the same pitch, said threaded portion being provided with a groove of substantial depth near the outer end thereof so as to form a threaded flange portion at the end of said pipe connector, said flange portion being of such dimension and said groove of such depth that when the outer part of said flange portion is engaged and pressed by said shoulder, said flange portion will be displaced from its normal position, whereby the threads thereof will be misalined with respect to the threads on the other part of said pipe connector.

7. A device of the class described including in combination a hose connector, a pipe connector, and an internally threaded tightening nut for securing said connectors together, said hose connector being provided with an external annular shoulder arranged to be engaged by the nut and to be moved by the same into abutting relation with the pipe connector, said pipe connector having an extended exteriorly threaded portion with threads of uniform pitch provided near the outer end with a groove of substantial depth so as to form a threaded flange portion at the end of the pipe connector, the latter being countersunk adjacent the bottom of the groove, the depth of the groove and the countersunk portion of the pipe connector forming a resilient connection between the threaded flange and the body portion of the pipe connector so that when the flange is engaged and subjected to pressure by said shoulder the threads of the flange will be automatically temporarily displaced with relation to the threads on the body portion of the pipe connector.

8. A device of the class described including in combination a hose connector, a pipe connector, and an internally threaded tightening nut for securing said connectors together, said hose connector being provided with an external annular shoulder arranged to be engaged by the nut and to be moved by the same into abutting relation with the pipe connector, said pipe connector having an extended exteriorly threaded portion with threads of uniform pitch provided near the outer end with a groove of substantial depth so as to form a threaded flange portion at the end of the pipe connector, the latter having a tapered countersunk portion adjacent the bottom of the groove, the depth of the groove and the countersunk portion at the bottom of the groove forming a resilient connecting portion connecting the threaded flange and the body portion of the pipe connector so that when the flange is engaged by said shoulder and subjected to pressure the threads of the flange will be automatically temporarily displaced with relation to the threads of the body portion of the pipe connector, said hose connector having a tapered portion arranged to engage the tapered countersunk portion of the pipe connector to form a tight joint.

FRANZ JACOBSON.

REFERENCES CITED

The following references are of record in the file of this patent:

UNITED STATES PATENTS

| Number | Name | Date |
| --- | --- | --- |
| Re. 20,542 | Dyer | Oct. 26, 1937 |
| 817,058 | Greenfield | Apr. 3, 1906 |
| 1,069,916 | Windsor | Aug. 12, 1913 |
| 1,519,126 | Furlan | Dec. 16, 1924 |
| 1,808,101 | Eastman | June 3, 1931 |